United States Patent Office 3,646,234
Patented Feb. 29, 1972

3,646,234
REACTION OF NAPHTHENE HYDROCARBONS
WITH ADAMANTANE COMPOUNDS
Robert E. Moore, Wilmington, Del., assignor to
Sun Oil Company, Philadelphia, Pa.
No Drawing. Continuation-in-part of application Ser. No.
80,779, Oct. 14, 1970, which is a continuation-in-part
of application Ser. No. 877,004, Nov. 14, 1969. This
application Nov. 19, 1970, Ser. No. 91,183
Int. Cl. C07c 3/54, 13/28
U.S. Cl. 260—666 M                                    14 Claims

ABSTRACT OF THE DISCLOSURE

Saturated adamantane hydrocarbons of the $C_{10}$–$C_{19}$ range having 0–3 alkyl substituents and/or their corresponding adamantanols are reacted with $C_5$–$C_{20}$ mono cyclic naphthene hydrocarbons by contacting a mixture of such reactants with sulfuric acid having a strength of 96–105% $H_2SO_4$ equivalent at a temperature between the freezing point of the acid and 100° C., more preferably 10–75° C. This causes a $C_5$–$C_{20}$ cycloalkyl or cycloalkylene moiety, derived from and having the same number of carbon atoms as the naphthene used, to become attached to the adamantane nucleus. Two types of alkylation products are obtained: (1) alkylated adamantane hydrocarbon having one adamantane nucleus per molecule with the $C_5$–$C_{20}$ cycloalkyl moiety as a bridgehead substituent; and (2) bis-type hydrocarbon product having two adamantane nuclei linked between bridgehead positions through the $C_5$–$C_{20}$ cycloalkylene moiety. When the starting naphthene has a $C_5$ ring, a naphthene dimerization product having perhydronaphthalene structure is also obtained. All types of products are particularly suitable as components of traction fluids.

CROSS REFERENCES TO RELATED
APPLICATIONS

This application is a continuation-in-part of my copending application Ser. No. 80,779, filed Oct. 14, 1970, which in turn is a continuation-in-part of application Ser. No. 877,004, filed Nov. 14, 1969, now abandoned.

My copending application Ser. No. 784,487, filed Dec. 17, 1968, discloses and claims the preparation of bridgehead monools in high yields from alkyladamantanes by dissolving an alkyladamantane at a temperature below 50° C. in fuming sulfuric acid having a strength above 102% $H_2SO_4$ equivalent and then reacting the mixture with water to form a bridgehead monool corresponding to the starting alkyladamantane.

My copending application Ser. No. 807,946, filed Mar. 3, 1969, now U.S. Pat. No. 3,546,308 issued Dec. 8, 1970, describes a process wherein hydroxyadamantane compounds are alkylated by reaction with aliphatic alcohols or monoolefins in the presence of strong sulfuric acid and alkyladamantane hydrocarbons are recovered as the reaction product.

In application Ser. No. 56,680, filed July 20, 1970, by Robert E. Moore and Abraham Schneider, a process is disclosed whereby alkyladamantanes and/or alkyladamantanols of the $C_{12}$–$C_{19}$ range containing 1–3 alkyl groups of the $C_1$–$C_3$ range are converted to hydrocarbon dimers in which two adamantane nuclei are linked to each other through an alkylene radical derived from and having the same number of carbon atoms as an alkyl group of the starting material. The reaction is effected by contacting the starting material with sulfuric acid having a strength in the range of 94–102% $H_2SO_4$ in the absence of any other reactant material. When dimethyladamantanes or ethyldimethyladamantanes or their monools are used, products are also produced which are like the dimers except that the adamantane nuclei are also joined through an ether linkage.

BACKGROUND OF THE INVENTION

This invention relates to the reaction of $C_5$–$C_{20}$ monocyclic naphthene hydrocarbons with saturated $C_{10}$–$C_{19}$ adamantane hydrocarbons having 0–3 alkyl substituents and/or corresponding adamantanols in the presence of strong sulfuric acid. The reaction effects alkylation of the adamantane nucleus to produce cycloalkyladamantanes and it also produces compounds having two adamantane nuclei linked through a cycloalkylene group derived from the naphthene hydrocarbon reactant. For convenience, these linked compounds are herein referred to as "bistype" products.

The adamantane nucleus has ten carbon atoms, four of which are bridgehead carbons that are equivalent to each other, as can be seen from the following typographical representation:

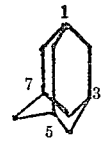

As shown, the bridgehead carbon atoms customarily are designated by the numerals 1, 3, 5 and 7 respectively, and these bridgehead positions are all equivalent to each other in the nuclear structure.

Starting materials for the present process include adamantane, 1- or 2-adamantanol, alkyladamantanes of the $C_{11}$–$C_{19}$ range having 1–3 alkyl substituents and/or the corresponding $C_{11}$–$C_{19}$ alkyladamantanols. When any of the adamantanols are used, the hydroxy group can be located at either bridgehead or nonbridgehead positions.

The preparation of methyl- and/or ethyl-substituted adamantanes by the isomerization of tricyclic naphthenes by means of an aluminum halide or $HF$–$BF_3$ catalyst has been described by several references including the following: Schneider U.S. Pat. No. 3,128,316, dated Apr. 7, 1964; Janoski and Moore U.S. Pat. No. 3,275,700, dated Sept. 27, 1966; Schneider et al. U.S. Pat. Nos. 3,336,405 and 3,336,406, dated Aug. 15, 1967; Schneider U.S. Pat. No. 3,356,751, dated Dec. 5, 1967; Schleyer et al., Tetrahedron Letters No. 9, pp. 305–309 (1961); and Schneider et al., JACS, 86, pp. 5365–5367 (1964). The isomerization products can have the methyl and/or ethyl groups attached to the adamantane nucleus at either bridgehead or nonbridgehead positions or both, although completion of the isomerization reaction favors bridgehead substitution. Examples of alkyladamantanes made by such isomerization are dimethyladamantanes, ethyladamantanes, methylethyladamantanes, dimethylethyladamantanes and trimethyladamantanes.

Preparations of adamantane hydrocarbons having $C_3$ or higher alkyl substituents have been described in the following references: Schneider U.S. Pat. No. 3,382,288, dated May 7, 1968; Capaldi U.S. Pat. No. 3,437,701, dated Apr. 8, 1969; and Spengler et al., Erdöl und Kohle-Erdgas-Petrochemie, vol. 15, pp. 702–707 (1962).

Procedures for converting adamantane hydrocarbons to bridgehead hydroxy derivatives have been described in the prior art. Schneider U.S. Pat. No. 3,356,740, dated Dec. 5, 1967, discloses the conversion of alkyladamantanes to bridgehead alcohols by air oxidation using a soluble metallic organic salt as catalyst, as also does Schneider U.S. Pat. No. 3,450,775, dated June 17, 1969. Moore U.S. Pat. No. 3,383,424, dated May 14, 1968, shows the oxidation of alkyladamantanes by means of chromic acid in aqueous acetic acid under conditions to produce either monools or diols.

The preparation of nonbridgehead adamantanols containing nonbridgehead alkyl groups from adamantanone and their conversion to the corresponding nonbridgehead alkyladamantanes have been described by Landa et al., Collection Czechoslov. Chem. Commun., vol. 32 (1967).

Alkyladamantanols in which the hydroxy group is at a nonbridgehead position can be made similarly from keto derivatives of alkyladamantanes which are obtained as by-products of the air oxidation process disclosed in aforesaid Schneider US. Pat. No. 3,356,740. Conversion of the keto group can be carried out by a Grignard synthesis in the manner described in the aforesaid Landa et al. reference or by Schleyer et al., JACS, 83, 186, which shows the reaction of adamantanone with methyl iodide and magnesium to yield 2-methyladamantanol-2. In analogous fashion the keto by-products of U.S. Pat. No. 3,356,740 can be converted to nonbridgehead alkyladamantanols also having at the nonbridgehead position an ethyl, n-propyl or isopropyl substituent in addition to the alkyl substituents that were present in the starting alkyladamantane hydrocarbon The aforesaid Schneider U.S. Pat. No. 3,382,288 discloses a process for alkylating adamantane hydrocarbons by means of cycloaliphatic alcohols or olefins using strong sulfuric acid as catalyst. For example, the reaction of cyclopentanol with dimethyladamantane to produce cyclopentyldimethyladamantane is disclosed.

SUMMARY OF THE INVENTION

The present invention provides a way of reacting monocyclic naphthene hydrocarbons of the $C_5$–$C_{20}$ range, as hereinafter more fully specified, directly with $C_{10}$–$C_{19}$ adamantane hydrocarbons or corresponding adamantanols or mixtures thereof, whereby a $C_5$–$C_{20}$ monocyclic hydrocarbon moiety becomes attached to the adamantane nucleus.

According to the invention, saturated adamantane hydrocarbons of the $C_{10}$–$C_{19}$ range having 0–3 alkyl substituents and/or adamantanols corresponding thereto are reacted with one or more monocyclic naphthenes in the $C_5$–$C_{20}$ range in which the naphthene ring has 5–6 carbon atoms and 0–3 alkyl substituents attached thereto, by contacting a mixture consisting essentially of these reactants with strong sulfuric acid having a strength in the range of 96–105% $H_2SO_4$ equivalent by weight, more preferably 98–104% $H_2SO_4$. The temperature of contacting is between the freezing point of the sulfuric acid and 100° C., more preferably in the range of 10–75° C. The contacting is continued until at least substantial reaction between the naphthene reactant and the adamantane feed compound has occurred. Thereafter there is recovered from the reaction mixture a hydrocarbon product containing at least one of the following products:

(1) Alkylated adamantane hydrocarbon corresponding to the adamantane feed compound but having attached to a bridgehead position of the adamantane nucleus a cycloalkyl group derived from and having the same number of carbon atoms as the naphthene hydrocarbon used, and (2) Bis-type hydrocarbon product comprising two adamantane nuclei linked to each other between bridgehead positions through a cycloalkylene group derived from and having the same number of carbon atoms as the naphthene hydrocarbon used.

Generally both types of products can be produced in substantial yields. In some instances the first-listed type can also include a minor amount of dialkylated product, that is, product which has two cycloalkyl groups attached to bridgehead positions of the nucleus. When the naphthene reactant has five carbon atoms in the ring, usually a naphthene dimerization product having perhydronaphthalene structure will be obtained as an additional product of the reaction. All of these products can be recovered in admixture with each other, such mixture being particularly useful as a component of traction or friction fluids. Alternatively each type of product can be recovered separately, e.g., by distillation, and the individual products likewise have utility in traction or friction fluid compositions.

Preferred products for use as traction fluid components are those made by reacting $C_5$–$C_8$ naphthenes, which more preferably are $C_6$–$C_8$ cyclohexanes, with $C_{12}$–$C_{14}$ alkyladamantanes or alkyladamantanols in which the alkyl substituents are methyl and/or ethyl.

DESCRIPTION

The adamantane compound used as starting material for the present process can be any saturated adamantane hydrocarbon of the $C_{10}$–$C_{19}$ range having 0–3 alkyl substituents or any corresponding adamantanol with the hydroxy group located at either a bridgehead or nonbridgehead position. Mixtures of such hydrocarbons or such adamantanols or both can be employed if desired. Alkyl groups in the alkyladamantanes or alkyladamantanols can be located at bridgehead or nonbridgehead positions or both and mainly will remain in the same position on the adamantane nucleus throughout the reaction. These alkyl substituents can range from methyl to nonyl, with the total number of alkyl carbon atoms per molecule not exceeding nine.

Preferred adamantane reactant material for the process comprises the alkyladamantane hydrocarbons of the $C_{12}$–$C_{19}$ range having one, two or three alkyl substituents, or their monools. The presence of alkyl groups on the nucleus of the feed material usually tends to reduce the solidification point of the resulting products and give them wider utility in friction or traction fluid applications. The most preferred alkyladamantane reactant compounds are the hydrocarbons of the $C_{12}$–$C_{14}$ range and particularly the following: dimethyladamantanes, trimethyladamantanes, ethyladamantanes, methylethyladamantanes and dimethylethyladamantanes. Some specific examples of these and other hydrocarbons that can be used are as follows: adamantane; 1-methyladamantane; 2-methyladamantane; 1,2-, 1,3- and 1,4-dimethyladamantane; 1- and 2-ethyladamantanes; 1 - ethyl - 3 - methyladamantane; 1-ethyl-4-methyladamantane; 1,2,4-, 1,2,5-, 1,3,4- and 1,3,6-trimethyladamantanes; 1 - ethyl - 2,4-dimethyladamantane; and 1-ethyl-3,6-dimethyladamantane. Illustrative examples of other starting hydrocarbons containing higher alkyl groups are: 1- and 2-butyladamantanes; 1-methyl-3-propyladamantane; 1,3-dimethyl-5-butyladamantane; 1-ethyl-2 - methyl-5-hexyladamantane; 1-pentyl-4-methyladamantane; 1,3-diisobutyladamantane; n-hexyladamantanes; n-nonyladamantanes; and the like.

Any adamantanol corresponding to the hydrocarbons as above defined is also suitable as reactant material. The hydroxy group can be located at either a bridgehead or nonbridgehead position on the nucleus. Substantially the same results will be obtained regardless of the original position of the —OH radical on the nucleus, inasmuch as immediate isomerization of the —OH to an unsubstituted bridgehead position on the nucleus occurs in the presence of the strong sulfuric acid used in the process.

The other reactant in the process is $C_5$–$C_{20}$ monocyclic naphthene hydrocarbon, more preferably $C_5$–$C_{12}$ monocyclic naphthene, in which the naphthene ring has 5–6 carbon atoms and 0–3 alkyl substituents attached thereto. Any such alkyl substituent attached to the ring should be either straight chain or singly branched, as more highly branched alkyl groups tend to undergo undesirable cracking reactions. When the naphthene reactant contains a $C_5$ ring, some amount of naphthene dimerization product usually is obtained in addition to the products resulting from alkylation of the adamantane nucleus. These naphthene dimers have two fused $C_6$ rings, being specifically perhydronaphthalenes. When the starting naphthene contains a $C_6$ ring, however, no analogous dimerization reaction occurs.

The following are illustrative examples of naphthene reactants that can be used in practicing the invention: cyclopentane; cyclohexane; methylcyclopentane; methylcyclohexane; dimethylcyclopentanes; dimethylcyclohexanes; trimethylcyclopentanes; trimethylcyclohexanes; cyclopentane or cyclohexane substituted with one, two or three ethyl, propyl, isopropyl, n-butyl, isobutyl, methylpentyl, n-hexyl, etc. groups in any positions or any combination of such substituents with each other or with 1–2 methyl substituents.

For making traction fluid components, the $C_6$–$C_9$ cyclohexanes, i.e. cyclohexane, methylcyclohexane, dimethylcyclohexanes, trimethylcyclohexanes, methylethylcyclohexanes, and iso- or n-propylcyclohexanes, are particularly suitable since good yields of the alkylated adamantane products which have unusually high traction coefficients can be obtained. However, the $C_5$–$C_7$ cyclopentanes, i.e. cyclopentane, methylcyclopentane and dimethylcyclopentanes, are also useful for this purpose since the dimers (i.e. perhydronaphthalenes) also produced in such cases likewise can function as traction fluid components (see Hamman et al. U.S. Pat. 3,411,369, dated Nov. 19, 1968).

Reaction of the adamantane hydrocarbon or monool feed material with the naphthene in accordance with the invention is effected by contacting a mixture of these reactants with strong sulfuric acid. The molar ratio of the adamantane compound to the naphthene can vary widely in the reaction mixture but usually will be in the range of 3:1 to 1:10. The ratio of acid to reactants can vary widely. Generally a volume excess of the acid relative to the reactants should be used and a volume ratio thereof in the range of 1:1 to 20:1 typically is employed. The mixture normally is an emulsion of acid and hydrocarbon phases, and the reaction takes place in the acid phase. The sulfuric acid should have a strength in the range of 96–105% $H_2SO_4$ equivalent by weight and more preferably 98–104% $H_2SO_4$. The reaction temperature can be from just about the freezing point of the acid used to about 100° C. and usually is in the range of 10–75° C.

Contact of the acid with the feed materials causes them to react in an unexpected manner, whereby the naphthene becomes an alkylating agent for the adamantane nucleus. Contacting of the mixture is continued until the desired reaction between the naphthene and the adamantane feed compound has been effected. The rate of reaction will depend upon the reaction temperature selected and the strength of the acid maintained in the reactor. The contacting can be continued until the adamantane compound has substantially all reacted, or the reaction can be stopped prior to such time and any unalkylated adamantane compound can be recovered and recycled for further conversion.

When the adamantane feed compound is the hydrocarbon it slowly diffuses into the acid phase as the mixture is agitated, becoming solubilized therein probably at least mainly in the carbonium ion form. When the feed compound is a monool, it readily dissolves completely in the acid and again probably exists therein mainly in carbonium ion form. The naphthene reactant diffuses from the hydrocarbon phase into the acid phase in order to react and the rate that this occurs depends on the degree of agitation, the temperature and the molecular weight of the naphthene used. The alkylated adamantane products precipitate from the acid phase as they are formed and become constituents of the hydrocarbon phase. Any perhydronaphthalenes formed by dimerization when the feed naphthene has a $C_5$ ring do likewise.

During the reaction the oxidizing power of the strong acid employed results in the conversion of hydrogen atoms derived from hydrocarbon reactant material into water. Concurrently sulfur dioxide is formed from the acid and tends to vaporize from the mixture unless the reaction is carried out under pressure. When the strength of the acid is high (e.g. 102–105% $H_2SO_4$), the reaction may occur so rapidly that the fast evolution of sulfur dioxide can present control problems unless the system is maintained under sufficient pressure. As water and sulfur dioxide are being formed, the strength of the sulfuric acid in the reaction mixture tends to decrease. This can be compensated for, if desired, by adding sulfur trioxide to the mixture as the reaction proceeds.

After the reaction has been completed, the acid phase is separated from the hydrocarbon phase and the latter is processed to recover the desired alkylation product. This product, as previously stated, generally includes alkylated adamantane hydrocarbon having one nucleus per molecule and the same alkyl groups as originally present while additionally having one cycloalkyl substituent (or to a minor extent two cycloalkyl substituents if the adamantane feed compound has no more than two alkyl groups), as well as bis-type product having two adamantane nuclei per molecule linked through a cycloalkylene radical. Both the additional cycloalkyl group or groups and the cycloalkylene radical are derived from the naphthene reactant and each has the same number of carbon atoms as the naphthene employed. The hydrocarbon phase can be distilled to separate any unreacted naphthene and adamantane feed hydrocarbon from the alkylation products. The latter can, if desired, be distilled to separately recover each of the two types of alkylation products formed in the reaction as well as any perhydronaphthalenes formed when the starting naphthene has a $C_5$ ring.

If the reaction is not carried to completion, adamantane reactant material will be present in the form of hydrocarbon in the hydrocarbon phase and other such material will be left in the acid phase in the form of carbonium ions. The latter can be recovered as the corresponding monool by quenching the acid phase with water (ice) to say 20–40% $H_2SO_4$. This causes the monool to precipitate as an oily phase which can be separated. In some cases where the strength of the acid used is in the lower part of the range above specified, e.g. 96% $H_2SO_4$, a small amount of ketone derived from the admantane reactant may also be present in the acid phase. Dilution of the acid likewise will cause it to precipitate along with any monool present. These compounds can be separated by distillation and the recovered monool can, if desired, be recycled for further conversion.

As a specific illustration of the invention, the reaction of cyclohexane with 1,3-dimethyladamantane (DMA) is considered. This reaction is effected, for example, by contacting a mixture of DMA and cyclohexane in a molar ratio of 1:2 with sulfuric acid having a strength of 100% $H_2SO_4$ at 50° C. for 10 hours. The acid and hydrocarbon layers are separated, the hydrocarbon layer is washed with water or aqueous alkali to remove residual acid, and the hydrocarbon material is then fractionally distilled to recover the products. The alkyladamantane product upon analysis is found to be composed mainly of the following (hydrogen atoms omitted for convenience):

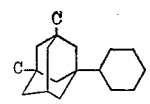

Specifically this product is 1,3-dimethyl-5-cyclohexyladamantane. The reaction may also produce a small amount of more highly alkylated product having one adamantane nucleus, which in this case would be 1,3-dimethyl-5,7-dicyclohexyladamantane. A higher boiling bis-type product is also obtained corresponding to the following structure:

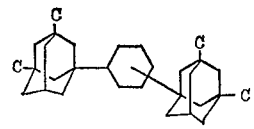

As indicated by the dangling valence, this is a mixture of isomers of bis(3,5-dimethyladamantyl-1)-cyclohexane.

When a monool of DMA is used instead of the hydrocarbon, the same hydrocarbon compounds as shown above are again obtained as the major products regardless of the original position of the hydroxy group on the nucleus. However, the reaction tends to proceed to completion more rapidly when the starting adamantane compound is a monool instead of the hydrocarbon. When cyclopentane is substituted for cyclohexane utilizing either DMA or a monool thereof as the other reactant, analogous compounds having $C_5$ instead of $C_6$ substituent rings are produced as reaction products, and also decahydronaphthalene is obtained due to dimerization of a portion of the cyclopentane.

As another specific illustration of the invention, a mixture of $C_9$ alkylcyclohexanes is used to alkylate 1-ethyladamantane (EA). This mixture of naphthenes can be obtained, for example, by fully hydrogenating a $C_9$ aromatic fraction of catalytic gasoline composed mainly of pseudocumene and mesitylene with minor amounts of hemimellitene and methylethylbenzenes to yield a mixture of corresponding naphthenes. An equimolar blend of these and 1-ethyladamantane is slowly added over a period of two hours to a reactor containing a batch of fuming sulfuric acid (102% $H_2SO_4$ equivalent) maintained at 10° C., with the mixture being vigorously stirred. The volume ratio of acid to total hydrocarbon added is about 5:1. After the reactants have been added, the mixture is stirred at about 10° C. for an additional three hours. The acid and hydrocarbon layers are then separated, and the hydrocarbon layer is washed to remove residual acid and then distilled to separate any unreacted feed material from the alkylation products. This procedure converts most of the 1-ethyladamantane to alkylated products including both types described hereinbefore, with the alkylate that contains one adamantane nucleus per molecule being the major product. Each type comprises a mixture of isomers in which the cycloalkyl and cycloalkylene moieties vary in structure depending upon which of the $C_9$ naphthenes were their precursors. The first type generally includes a minor amount of dialkylation product in which the adamantane nucleus has two cycloalkyl substituents.

Both types of alkylation products are usually obtained from the present reaction, but the proportions thereof can vary considerably depending upon the particular reactants and conditions selected. As a general rule, formation of the bis-type product relative to the alkyladamantane is favored by conditions which tend to promote higher concentrations of carbonium ions derived from the starting adamantane compound in the acid phase. Higher concentrations of such ions are favored, for example, by higher acid concentrations and higher temperatures when a mixture of equimolar amounts of adamantane hydrocarbon and naphthene reactants are fed to the reactor, or by using a mixture of the naphthene with a monool reactant instead of with an adamantane hydrocarbon feed.

As an illustration of producing bis-type material as the major product, the above-described reaction of 1-ethyladamantane and the mixed $C_9$ perhydroaromatics can be varied by first contacting the acid with only the 1-ethyladamantane until at least a substantial amount of the latter has dissolved and then slowly adding the $C_9$ naphthenes while vigorously stirring the mixture, all conditions otherwise being the same as described. This variation in technique favors a high concentration of ethyladamantyl carbonium ions in the acid phase and causes the bis-type alkylation material to become the predominant product.

From the present process when utilizing one or more $C_{12}$–$C_{14}$ alkyladamantanes or alkyladamantanols and one or more $C_5$–$C_8$ naphthenes, a particularly desirable mixture can be recovered composed of a combination of the two types of alkylated adamantane products as above described. This composition has outstanding utility as a component of traction fluids, since both of these types of alkylation products have unusually high traction coefficients as compared to most hydrocarbons. Also the fact that the mixture involves a plurality of hydrocarbons containing adamantane nuclei is advantageous, since the pour point is reduced and an intermediate viscosity level desired for various traction system applications is secured.

Friction or traction drive systems for the transmission of power have been described in numerous prior art references. See, for example, the following:

(1) Rounds, U.S. Pat. 3,394,603, dated July 30, 1968
(2) Hamman et al., U.S. Pat. 3,411,369, dated Nov. 19, 1968
(3) F. G. Rounds, J. of Chem. and Eng. Data, vol. 5, No. 4, pp. 499–507 (October 1960)
(4) Hewko, Rounds and Scott, Proceeding of the symposium on Rolling Contact Phenomena, pp. 157–185, Elsevier Publishing Co., Amsterdam (1962)

As can be seen from these references, special properties are required of the traction fluids used in friction drive systems. One desired property is a high coefficient of traction as measured, for example, by the test procedure described in reference (3) supra. As shown therein, most materials have traction coefficients (measured at a bearing speed of 600 ft./min.) less than 0.06, with the values for hydrocarbons usually falling in the range of 0.03–0.05. Of the hydrocarbons polybutene exhibited the highest traction coefficient, viz 0.051. In comparison, both the cycloalkyladamantane and the bis-type products of the present invention generally have traction coefficients measured in this manner as high as or higher than that for polybutene. For example, the traction coefficients of the cyclopentyl and cyclohexyl derivatives of 1,3-dimethyladamantane are about 0.051 and 0.055, respectively. These products are thus particularly valuable as additives for improving the traction coefficients of known types of traction fluid compositions. For example, a mixture of products defined above can advantageously be added to hydrogenated polybutene oil—a known traction fluid material as disclosed in the Rounds patent cited above—to produce an excellent traction fluid base stock.

The following examples are further illustrations of reactions in accordance with the invention:

EXAMPLE I

The reactants were cyclohexane and 3,5-dimethyladamantanol-1 (referred to as "DMA-ol"), and 25 ml. of strong sulfuric acid (100% $H_2SO_4$) were used. The acid at about room temperature in a flask was stirred by means of a magnetic stirrer and the DMA-ol was added in amount of 2.5 g. (0.0139 mole). As soon as the monool had dissolved, cyclohexane was added in amount of 1.17 g. (0.0139 mole), giving a molar ratio of DMA-ol to cyclohexane of 1:1. Stirring was continued at about 25° C. for one hour. The reaction mixture was then diluted with water and extracted with ethyl ether to recover all the products and unreacted material. The extracts were analyzed by GLC and identification of the components was carried out by using IR, NMR and mass spectroscopy. The resulting product composition, which is given below, does not include any unreacted cyclohexane and is based on materials boiling above this reactant.

| | Composition, percent |
|---|---|
| DMA | 79.4 |
| Methylcyclopentyl-DMA | 6.8 |
| Cyclohexyl-DMA | 7.9 |
| Unidentified | 3.0 |
| Bis-type product | 2.9 |

Note.—Yield of alkylate=20.6%.

While the structure of the material listed as "unidentified" was not specifically determined, it appears to be dialkylated DMA containing two $C_6$ cycloalkyl moieties since the chromatograph indicated that it was $C_{24}$ material. The above tabulation shows that the monoalkylated DMA comprised alkylates with differing $C_6$ substituents, specifically, methylcyclopentyl and cyclohexyl radicals. Although the $C_5$-ring moiety was formed to some extent from the cyclohexane during the reaction, no dimethyldecahydronaphthalenes were produced in this reaction. All of the starting DMA-ol which did not end up as alkylate was converted to the corresponding hydrocarbon, DMA. This material could, if desired, be recycled for further alkylation.

The cyclohexyl-DMA component of the reaction product, when tested for traction coefficient by Rounds' procedure at 600 ft./min. bearing speed, shows a value of 0.055. This typically illustrates the high traction coefficients of products that can be produced by the invention.

EXAMPLE II

Another run was made in the same manner as Example I except that methylcyclopentane was substituted for cyclohexane and the strength of the acid was reduced to 96% $H_2SO_4$, conditions otherwise being the same. Analysis of the reaction product on a $C_6$ naphthene-free basis showed the following composition:

| | Composition, percent |
|---|---|
| Dimethyldecahydronaphthalenes | 15.3 |
| DMA | 72.7 |
| Methylcyclopentyl-DMA | 5.0 |
| Cyclohexyl-DMA | 1.1 |
| Unidentified | 1.3 |
| Bis-type product | 4.6 |

NOTE.—Yield of alkylate=12.0%.

The product listed as "unidentified" again appeared to be $C_{24}$ material resulting from dialkylation of the adamantane nucleus. The data show that in this case a considerable proportion of the reaction product was dimethyldecahydronaphthalenes which resulted from dimerization of the methylcyclopentane feed. These products can, if desired, be separately recovered and used for making 2,6-dimethylnaphthalene as disclosed in Schneider U.S. Pat. No. 3,243,469, issued Mar. 29, 1966. Again the unalkylated DMA-ol ended up as the corresponding hydrocarbon (DMA) which can be recycled for further conversion to alkylation products.

When adamantane, adamantanol, other alkyladamantanes and other alkyladamantanols as hereindefined are substituted for the reactant adamantane compound in the foregoing examples, analogous results are obtained. Likewise when other monocyclic naphthenes of the $C_5-C_{20}$ range, as hereindefined, are substituted for the $C_6$ naphthenes employed in the examples above, analogous alkyladamantane and bis-type products are produced and also dimers of perhydronaphthalene structure usually are formed when the naphthene has a $C_5$ ring. Any of the resulting cycloalkylated adamantane products obtained in using such other reactants and also the perhydronaphthalene-type dimers have utility as components for traction fluid compositions.

Analogous results are also obtained when stronger sulfuric acid up to 105% $H_2SO_4$ is used in place of the acid employed in the foregoing examples. However, when the strength exceeds 102% $H_2SO_4$, the reaction has a tendency to proceed so fast that it may become uncontrollable at atmospheric pressure due to the rapid evolution of $SO_2$. Hence, in such case it is desirable to carry out the reaction in a closed system under preessure, or by the incremental addition of the hydrocarbon reactants to the acid.

The invention claimed is:

1. Method of attaching a $C_5-C_{20}$ monocyclic hydrocarbon moiety to the nucleus of an adamantane compound which comprises:
   (A) contacting a mixture consisting essentially of
      (1) sulfuric acid having a strength of 96–105% $H_2SO_4$,
      (2) an adamantane compound reactant material selected from the group consisting of (a) saturated adamantane hydrocarbons of the $C_{10}-C_{19}$ range having 0–3 alkyl substituents, (b) adamantanols corresponding to said adamantane hydrocarbons and (c) mixtures thereof,
      (3) and monocyclic naphthene hydrocarbon of the $C_5-C_{20}$ range in which the naphthene ring has 5–6 carbon atoms and 0–3 alkyl substituents attached thereto, said alkyl substituents being straight chain or singly branched,
   at a reaction temperature above the freezing point of said acid but below 100° C. until at least substantial reaction between the naphthene hydrocarbon and said adamantane compound has occurred;
   (B) and thereafter recovering from the reaction mixture a hydrocarbon product containing at least one of the following products:
      (1) alkylated adamantane hydrocarbon corresponding to said adamantane compound but having attached to a bridgehead position of the adamantane nucleus a cycloalkyl group derived from and having the same number of carbon atoms as said naphthene hydrocarbon, and
      (2) bis-type hydrocarbon product comprising two adamantane nuclei derived from said adamantane compound and linked to each other between bridgehead positions through a cycloalkylene group derived from and having the same number of carbon atoms as said naphthene hydrocarbon.

2. Method according to claim 1 wherein said reactant material is selected from the group consisting of adamantane, methyladamantanes, dimethyladamantanes, trimethyladamantanes, ethyladamantanes, methylethyladamantanes, dimethylethyladamantanes and corresponding monools having the hydroxy group attached to the adamantane nucleus.

3. Method according to claim 2 wherein said naphthene hydrocarbon is of the $C_5-C_{12}$ range.

4. Method according to claim 3 wherein said adamantane compound is selected from the group consisting of dimethyladamantane and trimethyladamantane.

5. Method according to claim 3 wherein said adamantane compound is selected from the group consisting of dimethyladamantanol and trimethyladamantanol.

6. Method according to claim 3 wherein the acid concentration is in the range of 98–104% $H_2SO_4$.

7. Method according to claim 3 wherein said naphthene hydrocarbon is selected from the group consisting of cyclohexane, methylcyclohexane, dimethylcyclohexanes and trimethylcyclohexanes.

8. Method according to claim 3 wherein said naphthene hydrocarbon is selected from the group consisting of cyclopentane, methylcyclopentane and dimethylcyclopentanes.

9. Method according to claim 8 wherein there is also recovered from the reaction mixture a naphthene dimerization product of perhydronaphthalene structure.

10. Method according to claim 9 wherein said naphthene hydrocarbon is methylcyclopentane and said dimerization product recovered is dimethyldecahydronaphthalene.

11. Method according to claim 1 wherein said naphthene hydrocarbon is a $C_5-C_9$ naphthene, said reactant material is selected from $C_{12}-C_{14}$ alkyladamantanes and $C_{12}-C_{14}$ alkyladamantanols and said reaction temperature is 10–75° C.

12. Method according to claim 11 wherein said naphthene hydrocarbon is a $C_6$–$C_9$ cyclohexane.

13. Method according to claim 12 wherein the acid concentration is in the range of 98–104% $H_2SO_4$.

14. Method according to claim 11 wherein said naphthene hydrocarbon is a $C_5$–$C_8$ cyclopentane and a naphthene dimerization product of perhydronaphthalene structure is also recovered from the reaction mixture.

References Cited
UNITED STATES PATENTS 3,382,288   5/1968   Schneider _____ 260—666 M DELBERT E. GANTZ, Primary Examiner V. O'KEEFE, Assistant Examiner